United States Patent

Long

[15] 3,644,821
[45] Feb. 22, 1972

[54] CAPACITANCE METHOD AND APPARATUS FOR DETECTING AN INTERFACE BETWEEN ELECTRICALLY CONDUCTIVE IMMISCIBLE LIQUIDS

[72] Inventor: Jack L. Long, Arvada, Colo.

[73] Assignee: The United States of America as represented by the United States Atomic Energy Commission

[22] Filed: Jan. 14, 1969

[21] Appl. No.: 791,036

[52] U.S. Cl. .......................... 324/61 R, 73/304 C, 324/65 R
[51] Int. Cl. ......................................................... G01r 27/26
[58] Field of Search ................................. 324/61,65; 73/304

[56] References Cited

UNITED STATES PATENTS

| 3,119,266 | 1/1964 | Atkinson | 73/304 |
| 3,312,936 | 4/1967 | Huntzinger | 73/304 X |
| 3,370,466 | 2/1968 | Chang | 73/304 |
| 3,474,337 | 10/1969 | Petrick | 73/304 X |
| 2,943,258 | 6/1960 | Shawhan | 324/61 X |
| 2,973,477 | 2/1961 | Lerner | 324/61 |

FOREIGN PATENTS OR APPLICATIONS

| 150,257 | 0/1962 | U.S.S.R. | 73/304 |

*Primary Examiner*—Edward E. Kubasiewicz
*Attorney*—Roland A. Anderson

[57] ABSTRACT

An interface level detector comprising a pair of electrodes each positionable in electrical contact with contiguous immiscible liquids wherein at least one of said liquids is electrically conductive, a source of alternating current in electrical series with the electrodes, means for moving one of said electrodes to the interface of said liquids and a voltage indicator electrically connected to said source of alternating current for sensing a change in electrical charge when said moving electrode reaches the interface between the liquids.

6 Claims, 2 Drawing Figures

PATENTED FEB 22 1972    3,644,821

INVENTOR.
JACK L. LONG
BY
Roland A. Anderson
Attorney

CAPACITANCE METHOD AND APPARATUS FOR DETECTING AN INTERFACE BETWEEN ELECTRICALLY CONDUCTIVE IMMISCIBLE LIQUIDS

BACKGROUND OF INVENTION

Plutonium metal may be purified within an electrorefining cell disclosed in U.S. Pat. Nos. 3,098,028 and 3,282,806. The molten impure metal is maintained as an anode in contact with a less dense molten electrolyte or salt such as potassium chloride and sodium chloride. A cathode also contacting the molten electrolyte is provided in a separate compartment of the electrorefining cell which serves as a receiver for purified electrodeposited plutonium. It is desirable to know the level of either or both the purified and contaminated plutonium as an indication of the completion of the purification process and as a warning of compartment wall failure. Conventional level-indicating devices such as a ball float may be difficult to adapt to this application as the overall or composite level within the electrorefining cell essentially remains constant while plutonium is merely electrolytically transferred from one compartment to another within the electrorefining cell. Prior devices which have attempted to detect the level of interfaces between immiscible liquids have sensed current flow through and the electrical resistance of the respective liquid layers. However such devices do not always provide the desired sensitivity in immiscible systems consisting of liquids having high electrical conductivity such as a molten metal and a molten salt.

SUMMARY OF INVENTION

It is an object of this invention to provide a method and device for detecting an interface between electrically conductive immiscible liquids.

It is a further object of this invention to provide a method and device for detecting an interface between a molten metal and a molten electrolyte.

It is also an object of this invention to provide a method and device for detecting the interface between molten plutonium metal and a molten salt in a plutonium-electrorefining process.

Various other objects will appear from the following description of one embodiment of the invention.

As shown, the invention includes a device for detecting the interface between electrically conductive immiscible liquids comprising a pair of electrodes disposable within the immiscible liquids, a source of alternating current for providing a capacitance charge on one of the electrodes, means for moving the charged electrode into contact with the interface, and an oscilliscope for displaying the voltage deflection resulting from capacitance discharge of the electrode at the interface.

DESCRIPTION OF DRAWINGS

One embodiment of the invention is illustrated in the accompanying drawings wherein.

DETAILED DESCRIPTION

Figure 1:
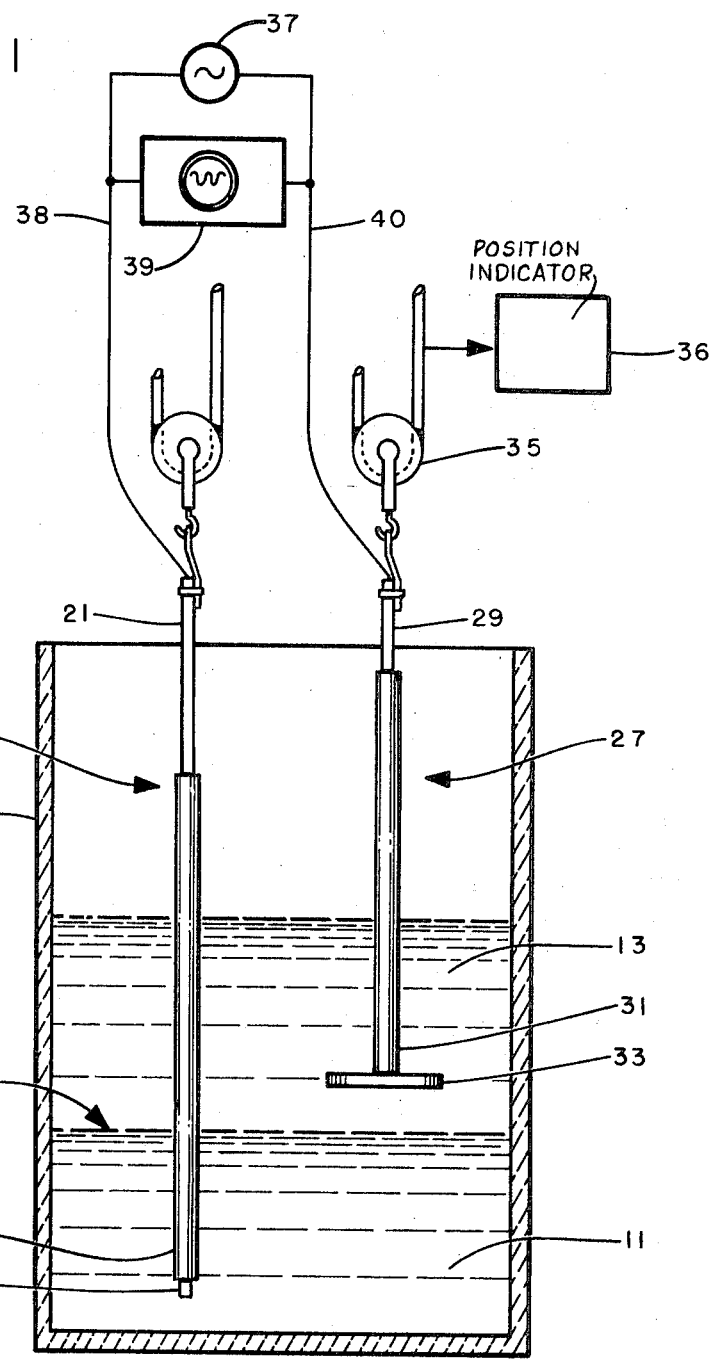
FIG. 1 is a schematic type diagram showing an interface detector device.

FIG. 1 illustrates one system incorporating the present invention in which an electrically conductive liquid 11 is disposed in subjacent contact at interface 17 with another immiscible electrically conductive liquid 13, both enclosed within a vessel or crucible 15 of suitable material. Liquid 11 typically may be a molten metal such as plutonium while liquid 13 may be a molten salt such as KCl–NaCl mixture in which case crucible 15 may be a suitable ceramic such as magnesia.

A first, generally stationary electrode or probe 19 may include a rod or wire 21, composed of an electrically conductive material, such as a material which will not readily react with the immiscible liquids like tantalum, which may be insulated and shielded along a sufficient portion of its length by a sealed tube or conduit 23 to prevent unwanted contact with the liquid layers. Conduit 23 may be of any appropriate dielectric or insulator material which is compatable with the liquids 11 and 13 at the system operating temperatures, such as aluminia. The conduit 23 and rod 21 may be securely held together to avoid relative translation therebetween. An electrically uninsulated or unshielded tip or end portion 25 of rod 21 may extend beyond conduit 23 for contacting liquid layer 11.

A second electrode or probe 27 may have a rod 29 shielded by a conduit 31 similar to the constructions of the first electrode 19. Probe 27 may include a bare or electrically unshielded end portion or plate 33 for normally contacting the liquid 13. The electrodes 19 and 27 may be so arranged so that end portions 33 and 25 are disposed astraddle or across the interface 17. End portion 33 becomes one plate or side of an oscillating charged capacitor when alternating current is applied to the two electrodes 19 and 27. The charge stored in end plate 33 may be released when it is lowered to contact the molten metal layer 11 at interface 17. The electrically exposed area of end portion 33 must be sufficiently large to provide a detectable capacitance discharge when contact is made. For example, end plates having a total surface area exceeding about one-half inch square have been used successfully. The required surface area may be dependent on the sensitivity of the associated electrical sensing equipment. End plate 33 may have any convenient shape such as rectangular, circular or semicircular, with or without concentric cutouts depending on the shape and size of vessel 15 and any other equipment or apparatus disposed therein.

It will be clear that probe 19 may be substantially similar to probe 27 having an end plate with a relatively large external area. Furthermore, the tantalums rods 21 and 29 and conduits 23 and 31 may have suitable bends or offsets to adapt them to the intended use.

Probe 27 may be supported by any conventional mechanical means such as a hydraulic cylinder or a pulley arrangement 35, as shown, which may be used to raise and lower end plate 33 through the liquids 11 and 13 into contact with interface 17. Conduit 31 or pulley arrangement 35 may be graduated with conventional electrical or mechanical position indicating means 36 such that the exact position of end plate 33 may be ascertained. Probe 19 may be supported by any suitable means which can retain end portion 25 in electrical contact with one of the immiscible liquids such as layer 11, as shown. If probe 19 is to remain stationary it may be permanently mounted in and insulated from container 15 walls or connected to some conductive apparatus immersed in only one of the liquids (not shown).

A source of alternating current or signal generator 37 and an ungrounded oscilloscope 39 may be electrically connected in series with probes 19 and 27 and in parallel to one another through leads 38 and 40. Signal generator 37 may be adjustable to some suitable frequency such as about 20–30 megacycles. Oscilloscope 39 may be of any suitable type which will display the desired frequencies generated by the alternating-current source 37 and have sufficient sensitivity to sense a capacitive discharge.

Figure 2:
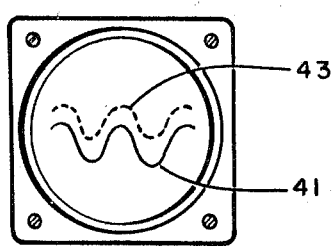
FIG. 2 is a representation of an oscilloscope trace deflection produced in operating the device of FIG. 1.

An oscilloscope trace is shown in FIG. 2 where solid line 41 represents the normal trace characteristic of the output of signal generator 37. Dotted line 43 depicts a deflection of the trace observable when a charge stored in end plate 33 is discharged at interface 17. After discharge, the displayed oscilloscope trace will then immediately return to the normal line 41.

As stated, the interface detector may be used with the plutonium electrorefining process disclosed in U.S. Pat. No. 3,098,028 and 3,282,806. In this process, liquid 11 may be molten plutonium while liquid layer 13 may be molten electrolytic salt. This process is carried out at 700°–800° C. and suitable high temperature precautions must be taken. For instance the protective conduits or electrode shields may be composed of alumina, the crucible of magnesia and the electrodes including their unshielded parts may be tantalum as mentioned.

In conjunction with the plutonium-electrorefining process, electrode 19 is lowered such that end portion 25 is disposed beneath the interface 17 into the molten plutonium metal 11. Electrode 27 having an unshielded tantalum end plate 33 may be initially positioned above the supernatant molten NaCl–KCl salt electrolyte 13. The signal generator 37 is activated and the oscilloscope 39 displays random electronic noise and static. Electrode 27 is slowly lowered until end plate 33 contacts the surface of the molten salt layer 13 which produces a large change in the electrical conductivity of the system and changes the oscilloscope trace to a pattern characteristic of the applied frequency signal shown as 41 in FIG. 2. When the end plate 33 is lowered to contact the interface 17 between the molten metal 11 and the molten salt 13, a momentary vertical deflection of the trace is displayed on the scope as shown in FIG. 2 by dotted line 43. This deflection is due to the discharge of the double layer capacitance at the interface between end plate 33 and the molten metal. If desired this capacitance discharge may be amplified by a suitable electronic relay and used to activate other control or warning means.

The interface detector is not limited to use with the plutonium-electrorefining process, but may be used to locate the interface between other immiscible electrically conductive liquids or between a dielectric and a conductive liquid. However, it has proven especially efficacious with electrically conductive liquids having high conductances, particularly molten salts and metals. Should the detector be used in conjunction with a molten metal which is less dense than the molten electrolyte, then end plate 33 may be initially submerged in the bottom electrolyte layer while the other exposed end portion 25 may be disposed in the supernatant molten metal. Electrode 27 may be slowly raised until a capacitance discharge results on contact between end plate 33 and the molten metal.

The device may also be operated by placing both the exposed end of the generally stationary electrode and the end plate of the movable electrode in the same liquid and then moving one of the electrodes through or to the interface and sensing the assumption of a capacitance charge on the end plate. If the liquid in which both electrode end portions are initially placed is the liquid having the highest conductivity, the electrode having the end plate will be moved through the interface, whereas if this liquid is the liquid having the lowest conductivity, the generally stationary electrode may be moved to the interface and thus achieve the desired detectable change in capacitance charge. The assumption of a capacitance charge may deflect line 41 in the opposite direction from line 43 in FIG. 2.

This invention allows the detection of an interface between electrically conductive liquids which cannot be done with systems which compare electrical resistance or current flow at various liquid levels. Also the level of the supernatant liquid may be ascertained without additional apparatus. It is especially useful for detecting the interface between a molten salt and a molten metal such as in a plutonium-electrorefining process.

It will be understood that various changes in the details, materials, and arrangements of parts, which have been described may be made by those skilled in the art within the principles of the invention as expressed in the appended claims.

What is claimed is:

1. A device for detecting an interface between highly electrically conductive immiscible liquids having generally similar conductivities comprising a first insulated electrode having an exposed electrically conductive end portion disposed in and in electrical contact with only one of said conductive liquids with the remainder of said first electrode electrically insulated from both of said liquids, a second insulated electrode having an enlarged end portion with exposed conductive metal surface initially in electrical contact with only said other conductive liquid with the remainder of said second electrode electrically insulated from both of said liquids, means for providing an alternating current signal through said conductive liquids between said first and second electrode end portions for producing a double-layer capacitance charge at said interface, means for moving said second electrode enlarged end portion through said other liquid to said interface, means electrically coupled to said electrodes for monitoring the normal alternating-current signal through said conductive liquids between said electrodes and for detecting a momentary direct current discharge of said capacitance charge between said first electrode and said liquids at said interface, and means for indicating the position of said second electrode end portion when said second electrode end portion contacts said interface and changes its capacitance charge.

2. The device of claim 1 wherein a container houses said electrodes, a molten metal is disposed within the lower portion of said container, a molten salt is disposed within said container and supported by said molten metal, said first electrode end portion is disposed within said molten metal, and said enlarged end portion of said second electrode is initially disposed in said molten salt.

3. The device according to claim 2 wherein the said molten metal is plutonium.

4. The device according to claim 1 wherein said detecting means includes an oscilloscope connected in parallel with said electrodes.

5. The device according to claim 1 wherein said end portion of said second electrode comprises a plate having an exposed surface area of at least one-half inch square.

6. A method of detecting the interface between immiscible highly electrically conductive liquids having generally similar conductivities comprising the steps of submerging a conductive end portion of a first electrode in only one of said conductive liquids while insulating the remainder of said first electrode from both liquids, submerging an enlarged conductive end portion of a second electrode initially in only the other of said liquids while insulating the remainder of said second electrode from both liquids, providing an alternating electrical current through said liquids between said electrodes producing a double-layer capacitance charge at said interface, moving said second electrode to said interface, sensing the discharge of said capacitance charge on said second electrode as said second electrode reaches said interface, and measuring the position of said second electrode at said interface.

* * * * *